US 7,007,921 B2

(12) United States Patent
Elsässer et al.

(10) Patent No.: US 7,007,921 B2
(45) Date of Patent: Mar. 7, 2006

(54) HIGH-SPEED CONTROLLING DEVICE

(75) Inventors: Alfred Elsässer, Keltern (DE); Wolfgang Schilling, Waiblingen (DE); Jan Schmidt, Stuttgart (DE); Joachim Heinrich, Jena (DE); Frank Beyer, Ilmenau (DE)

(73) Assignee: MAHLE Filtersysteme GmbH, Stuttgart (DE)

( * ) Notice: Subject to any disclaimer, the term of this patent is extended or adjusted under 35 U.S.C. 154(b) by 91 days.

(21) Appl. No.: 10/486,662

(22) PCT Filed: Aug. 16, 2002

(86) PCT No.: PCT/DE02/02992

§ 371 (c)(1), (2), (4) Date: Feb. 12, 2004

(87) PCT Pub. No.: WO03/018979

PCT Pub. Date: Mar. 6, 2003

(65) Prior Publication Data
US 2004/0244756 A1 Dec. 9, 2004

(30) Foreign Application Priority Data
Aug. 18, 2001 (DE) ................ 101 40 706

(51) Int. Cl.
*F02D 9/10* (2006.01)
(52) U.S. Cl. .............. 251/129.09; 251/129.11; 123/184.53
(58) Field of Classification Search ......... 251/129.09, 251/129.11; 123/184.53
See application file for complete search history.

(56) References Cited

U.S. PATENT DOCUMENTS

| 5,131,365 A | | 7/1992 | Schatz |
| 5,531,205 A | | 7/1996 | Cook et al. |
| 5,624,100 A | * | 4/1997 | Bolte et al. ............... 251/65 |
| 6,247,447 B1 | * | 6/2001 | Muraji ................. 123/399 |
| 6,427,650 B1 | * | 8/2002 | Cristiani et al. ......... 123/90.11 |

FOREIGN PATENT DOCUMENTS

| DE | 35 46 513 | 2/1987 |
| DE | 37 37 824 | 5/1989 |
| DE | 43 35 687 | 4/1995 |
| DE | 198 24 537 | 12/1999 |
| DE | 695 19 078 | 5/2001 |
| EP | 0 761 949 | 3/1997 |
| EP | 1 087 110 | 3/2001 |
| GB | 1 572 229 | 7/1980 |
| WO | WO 98/42953 | 10/1998 |

* cited by examiner

*Primary Examiner*—J. Casimer Jacyna
(74) *Attorney, Agent, or Firm*—Collard & Roe, P.C.

(57) ABSTRACT

The present invention relates to a high-speed controlling device, suitable for displacing a switching element between two positions with very short switching times. Said device comprises two switchable electromagnets, between which an armature, with a driven coupling to the switching element, is arranged. According to the invention, said armature contacts the first electromagnet in the first position of the switching element and contacts the other electromagnet in the second position of the switching element. In order to obtain particularly short switching times for the switching element, the armature can be firmly secured to a shaft, which is rotatably mounted about its longitudinal axis and to which said switching element is also fixed in an axially offset manner in relation to the armature.

18 Claims, 4 Drawing Sheets

HIGH-SPEED CONTROLLING DEVICE

CROSS REFERENCE TO RELATED APPLICATIONS

Applicants claim priority under 35 U.S.C. §119 of German Application No. 101 40 706.8 filed Aug. 18, 2001. Applicants also claim priority under 35 U.S.C. §365 of PCT/DE02/02992 filed Aug. 16, 2002. The International application under PCT article 21(2) was not published in English.

BACKGROUND OF THE INVENTION

1. Field of the Invention

The present invention relates to a high-speed actuating device suitable for actuating a switching device between two switch positions in very short switching times, having the features of the preamble of Claim 1.

2. The Prior Art

In certain applications, a mechanical switching device must be actuated between two switch positions within an extremely short switching time. For example, German Patent DE 37 37 824 A1 describes a method of operating an internal combustion engine. This internal combustion engine has an intake channel leading to at least one combustion chamber of the engine, at least one intake valve which is situated between the intake channel and each combustion chamber and determines the start of intake and the conclusion of intake into the combustion chamber and an additional valve situated upstream from the intake valve. According to the known operating method, this additional valve is opened when the intake valve is opened and is closed temporarily during a period of time that maintains an interval from the beginning of intake to the end of intake. Due to this procedure, dynamic effects in the intake stroke of the piston being actuated in the respective combustion chamber can be utilized to increase the loading of the combustion chamber with fresh air. In addition, definitely shorter opening times, in particular a plurality of opening times, can be implemented within the opening period of the intake valve through appropriate operation of the additional valve, and these opening times can also be shifted toward "early" or "late" relatively arbitrarily within said opening period. To this extent, with the help of the additional valve, which can be operated appropriately, it is possible to implement variable valve control units even if the actual valve control, e.g., by means of a camshaft, is invariant per se.

To open and close the additional valve during the opening time of the intake valve(s) once or more, very short switching times must be implemented for the additional valve. The switching times required to accomplish this amount to about 2 ms in this specific embodiment. Switching times of about 10 ms can be achieved with traditional electric motors.

International Patent WO 98/42953 discloses a high-speed actuating device having two switchable electromagnets between which is arranged an armature that is drive-coupled to the switching device, which is designed as an intake valve or exhaust valve of an internal combustion engine. In the first switch position of the valve, the armature is in contact with the one electromagnet, while in the second switch position, it comes to rest against the other electromagnet. The armature here is connected by way of a connecting part to a rotating rod, which is rigidly clamped on a stationary component of the actuating device. An operating element is mounted on the armature, cooperating with the valve for at least an opening stroke. The known high-speed actuating device serves here as a valve drive in an engine with which variable control times for the respective valve can be implemented. At a high rotational speed of the internal combustion engine, actuating times of approximately 3 ms can be achieved with the help of such a high-speed actuating device.

However, there is a demand for a high-speed actuating device with the help of which it is possible to implement even shorter switching times. For the other type of application mentioned above for operation of an additional valve, this means, for example, shortening the switching times by at least 30%.

U.S. Pat. No. 5,131,365 describes a high-speed actuating device of the type defined in the preamble, which is suitable for adjusting a switching element designed as a switching flap between two switch positions with very short switching times. The switching valve is situated in a gas-carrying line, namely in an intake channel of an internal combustion engine upstream from an intake valve; in a first switch position, it can close off the line cross section, and in the second switch position, it can open the line cross section. With the known high-speed switching device, the switching flap is prestressed in its closed position with the help of a prestressing spring. An electromagnet is provided, holding the switching flap in its closed position, so that in the filling stroke of the piston, a vacuum pulse can be built up on the cylinder end. As soon as the electromagnet releases the switching flap, the vacuum on the cylinder end causes the switching flap to open. As soon as the pressure on the switching flap is equalized, the restoring spring can adjust the switching flap back into its closed position in which it can then be held again by the electromagnet. The known high-speed actuating device thus operates passively, namely as a function of the piston movement. However, it would be desirable to have a high-speed adjusting device which can be used much more flexibly and nevertheless permits extremely short switching times.

British Patent 1,572,299 discloses another high-speed actuating device with the help of which a deflector plate can be switched between two end positions. This deflector plate works as a shunt in a conveyor zone for bulk printed matter or the like and is drive-connected via a shaft to an armature. This armature is rotatably adjustable about the longitudinal axis between two electromagnets.

SUMMARY OF THE INVENTION

The present invention is concerned with the problem of providing an embodiment for a high-speed actuating device of the type defined in the preamble, so that particularly short switching times can be implemented. In addition, the high-speed actuating device should have a compact design, in particular to thereby make it possible to accommodate the high-speed actuating device in the engine space of a motor vehicle.

This problem is solved according to this invention by a high-speed actuating device having the features of claim 1.

This invention is based on the general idea of designing the high-speed actuating device as a rotational drive in which the armature drives the switching device to execute pivoting adjustments as directly as possible. This is achieved by a rotatably mounted shaft on which both the armature and the switching device are fixedly mounted. Thus, in this design, the switching device is designed to be rotationally adjustable between its two switch positions by rotating about the longitudinal axis of this shaft. Due to the design according to this invention, the masses to be moved by the high-speed actuating device are relatively close to the rotational center of the actuating movement, so that relatively low moments of inertia are achieved on the whole. Smaller moments of inertia promote faster switching times, and at the same time the energy demand for implementation of the short switching times is reduced. The high-speed actuating device can therefore be designed to be compact.

According to an especially advantageous embodiment, each electromagnet may have a yoke on which is provided a stop surface for the armature against which the armature comes to rest in one of its switch positions. The yoke should be interrupted in the area of the stop surface by a gap which is bridged by the armature when the armature is in contact with the stop surface. Due to this measure, there is a controlled shaping of the magnetic field created by the yoke in the area of the stop surface, so as to achieve an extreme increase in the magnetic attractive forces acting on the armature. Whereas the magnetic field lines run essentially inside the yoke up to the gap, a convex curve is obtained for bridging the gap, extending toward the armature, where it creates a corresponding polarization.

The smaller the gap width of the gap, the more pronounced is the curvature of the magnetic field lines. An embodiment in which the opening width of the gap is smaller than the thickness of the armature is preferred, the thickness being measured across the radial extent of the armature and across the axial extent of the armature.

In a special refinement, the yoke may have a cross section which tapers toward the gap at least in an end section which ends at the gap. As a result of this measure, there is a concentration of the magnetic field lines toward the stop surface in the end section having the tapered cross section, so that the bulging of the magnetic field lines toward the armature can be additionally increased. Thus, this measure also results in an increase in the magnetic attractive forces acting on the armature.

According to an advantageous refinement, a spring element may be coupled to the shaft, with this coupling taking place in such a manner that in the two switch positions of the switching device, the spring element initiates a restoring torque into the shaft, driving the switching device in the direction of the other switch position, and the spring element does not initiate any restoring torque into the shaft in a middle position of the switching device. Due to this design, the spring element acts more or less as a storage device for potential energy which is fully loaded in both switch positions and manifests its maximum power output to accelerate the armature in switching the electromagnets at the beginning of the rotational adjustment, i.e., at a point in time when the magnetic field must be built up.

A particularly compact design is obtained when the shaft is designed as a hollow shaft and the spring element is designed as a torsion rod, which extends coaxially in the hollow shaft and is connected to the hollow shaft in a rotationally fixed manner at one end and to a stationary component of the high-speed actuating device in a rotationally fixed manner at the other end. In other words, the torsion rod is rigidly clamped with the end which leads out of the hollow shaft. This design also has the advantage that the torsion rod has a minimum moment of inertia due to its central arrangement in the hollow shaft and thereby maximum accelerations are supported.

According to a particularly clever design, on the end of the torsion rod which is assigned to the switching device, the torsion rod may be mounted on the end of the hollow shaft assigned to the armature, while the hollow shaft is radially supported directly or indirectly on the torsion rod. This design simplifies the mounting of the hollow shaft in the area of the rigidly clamped end of the torsion rod.

The problem on which the present invention is based is also solved by an application according to claim 18.

Additional important features and advantages of this invention are derived from the subclaims, the drawings and the respective description of the figures on the basis of the drawings.

It is self-evident that the features mentioned above and also to be explained in greater detail below can be used not only in the combination given here but also in any other combinations or even alone without going beyond the scope of the present invention.

BRIEF DESCRIPTION OF THE DRAWINGS

Preferred exemplary embodiments of this invention are illustrated in the drawings and are explained in greater detail in the following description, where the same reference notation is used to refer to the same or functionally same or similar components.

The drawings show the following in schematic diagrams.

DETAILED DESCRIPTION OF PREFERRED EMBODIMENTS

Figure 1A:
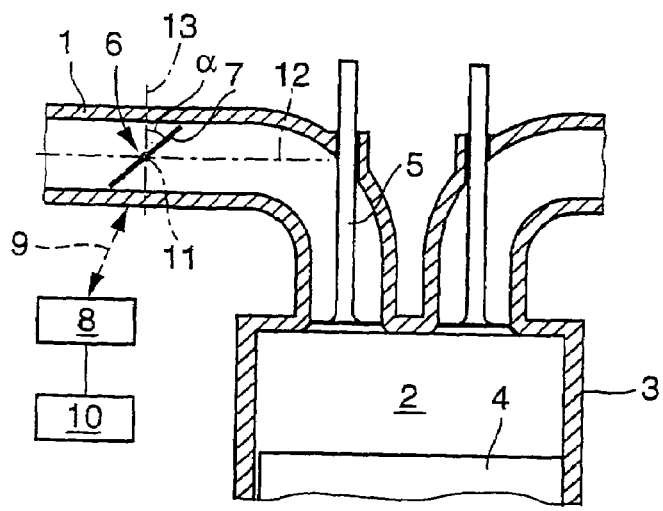
FIGS. 1A–1C basic diagrams of a particular application of the present invention in various positions of a switching device.

According to FIGS. 1A through 1C, an engine (not shown in detail), in particular in a motor vehicle, has an intake channel 1 which may also be referred to below as a fresh air supply line. The engine may be designed as a diesel engine or an internal combustion engine as well as an aspirating engine or a supercharged engine. The intake channel 1 leads to at least one combustion chamber 2 of the engine, which is provided in a cylinder 3 in which a piston 4 is mounted so that it has an adjustable stroke. An intake channel 5 is situated at the transition between the intake channel 1 and the combustion chamber 2; likewise, embodiments having a plurality of intake valves 5 are also possible. Upstream from this intake valve 5, an additional valve 6, which is provided in the intake channel 1, may also be referred to below as a switching device. This additional valve or switching device 6 is designed here as a switching flap 7 and may be used, for example, to improve the filling of the combustion chamber 2 with fresh air in that dynamic flow effects are utilized in the process of filling the combustion chamber 2 through targeted switch operation of the additional valve 6. The intake channel or the fresh air supply line 1 thus forms a gas-carrying line in the application illustrated here, its line cross section optionally being opened or closed with the help of the switching device 6.

For operation of the additional valve or the switching device 6, a high-speed actuating device 8 is provided and is drive-connected to the additional valve 6 in a suitable manner. The drive connection is represented symbolically by a dotted-line arrow 9 in FIGS. 1A through 1C. A suitable controller 10 is provided for controlling the high-speed actuating device 8.

Figure 1B:
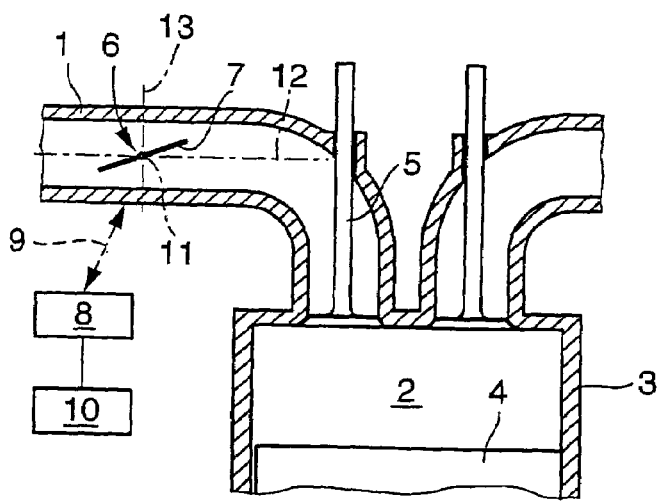
Figure 1C:
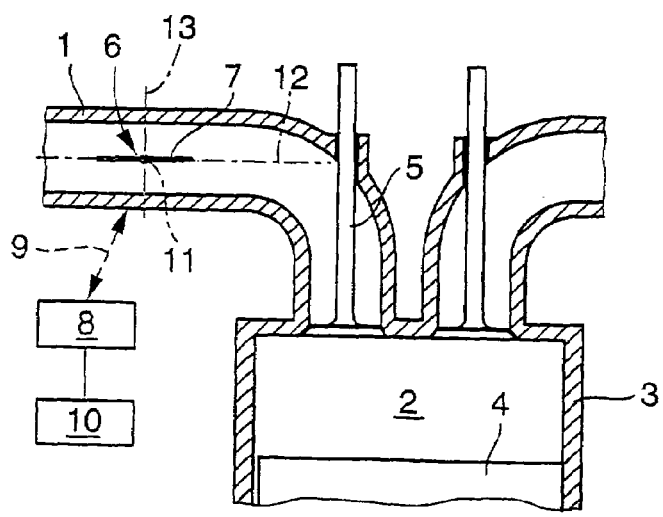

With the help of the high-speed actuating device 8, the switching device 6 is adjustable between a first switch position, which is illustrated in FIG. 1 and in which the switching device 6 closes off the line cross section of the intake channel 1, to a middle position shown in FIG. 1D and then to a second switch position shown in FIG. 1C, where the switching device 6 opens (maximally) the line cross section of the intake channel 1. In the preferred embodiment shown here, the switching flap 7 is arranged in the line cross section in such a way that its pivot axis 11 is essentially perpendicular to a longitudinal central axis 12 of the intake channel 1. According to the representation selected here, this pivot axis 11 is thus perpendicular to the plane of the drawing. In addition, the switching flap 7 is dimensioned and positioned in such a way that in its first switch position according to FIG. 1A, it runs at an angle α to a plane 13, which is perpendicular to the longitudinal axis 12 of the intake channel 1 and/or in which the line cross section of the intake channel 1 is situated. In the embodiment shown here, this angle α is 45°. This arrangement yields a reduction in the actuation path and actuation angle which is necessary to pivot the switch flap 7 between its two switch positions according to FIG. 1A and FIG. 1C, because in the second switch position according to FIG. 1C, the switch flap 7 runs essentially parallel to the line axis 12 to achieve a maximum degree of opening so that the angle of rotation by which the switch flap 7 must be pivoted between its switch positions according to FIGS. 1A and 1C is only 45°. It is clear that the switching times necessary to adjust the switch flap 7 are thereby reduced accordingly.

Figure 2:
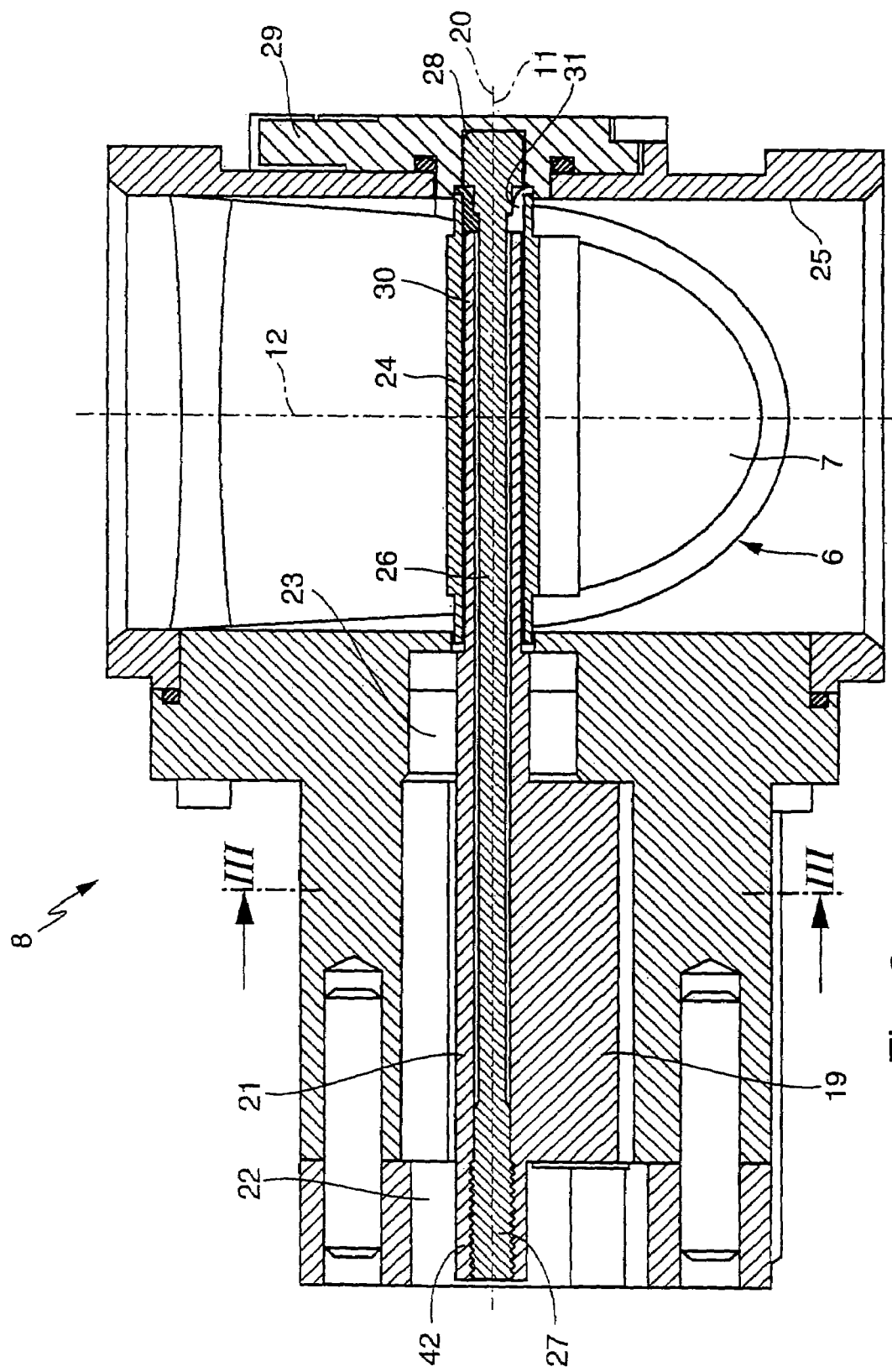
FIG. 2 a longitudinal section through an inventive high-speed actuating device.
Figure 3:
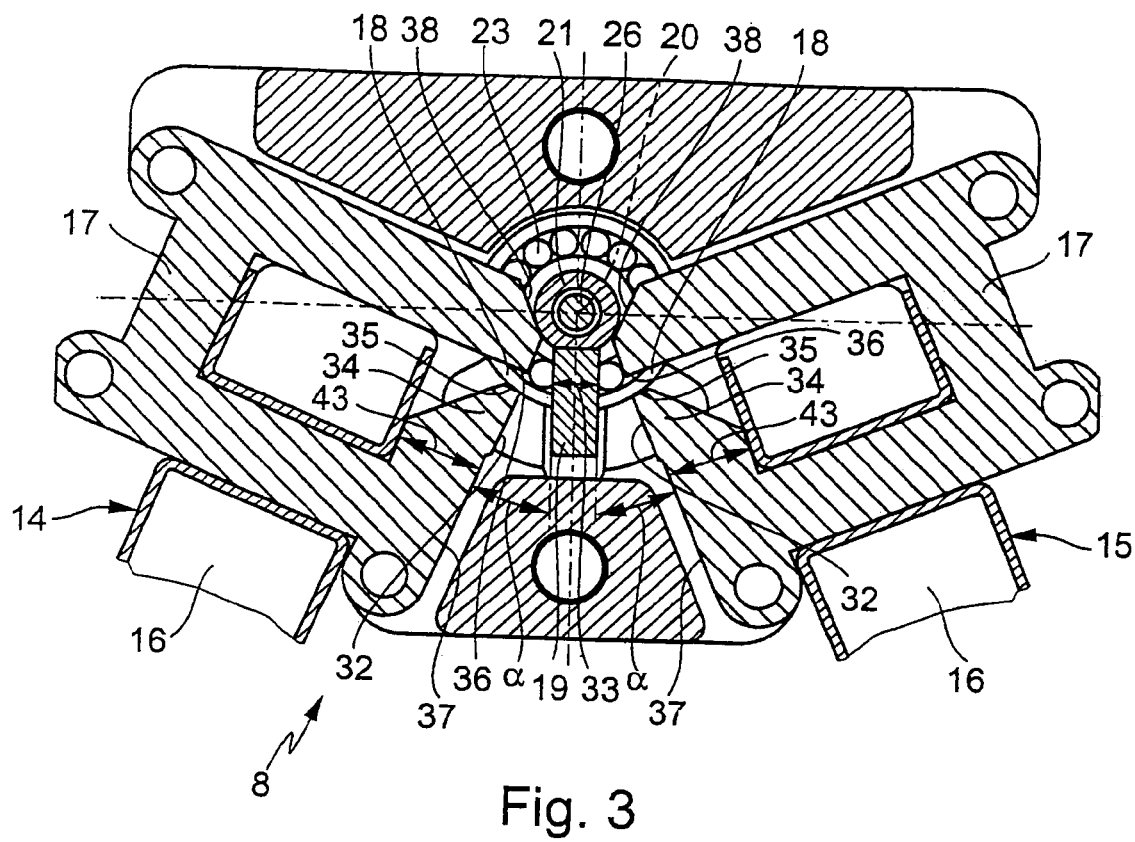
FIG. 3 a cross section according to the sectional lines III in FIG. 2 through the high-speed actuating device.

According to FIGS. 2 and 3, the high-speed actuating device 8 according to this invention has two electromagnets 14 and 15, which are arranged in a V shape in cross section according to FIG. 3. Each electromagnet 14, 15 has a coil 16 and a yoke 17 which surrounds one half of the coil 16 in a ring shape except for a gap 18. The yokes 17 are usually made of a relatively easily magnetizable iron or steel, and in particular the yokes 17 are made of sheet metal in a sandwich structure. The electromagnets 14, 15 are thus designed to be switchable. For simplified production, it is expedient to assemble the yokes 17 of at least two individual parts, whereby the coil 16, which has already been completely wound in advance simultaneously with the assembly of the yokes, can be used and/or the unwound coil 16 can be used and can be wound relatively easily.

Between the electromagnets 14 and 15 there is an armature 19, which is adjustably mounted so it can rotate about a pivot axis 20. To this end, the armature 19 is connected to a shaft 21 in a rotationally fixed manner. The armature 19 may be welded to the shaft 2, for example, or it may be manufactured in one piece with it. In the two-part variant, it is possible to manufacture the shaft 21 and the armature 19 from different materials. The armature 19 is preferably made of an easily magnetizable iron or steel, but it may be advantageous for the shaft 21 to be made of an iron or steel that is difficult or impossible to magnetize, e.g., austenitic steel. The shaft 21 is mounted in radial bearings 22 and 23 on both sides of the armature 19 so it can be adjusted by rotation.

According to FIG. 2, the switching device 6, which is designed here as an elliptical switching flap 7, is also rotationally fixedly connected to the shaft 21. The switching device 6 here is axially offset from the armature 19 on the shaft 21. It is expedient for the switching flap 7 to be made essentially of an extremely lightweight material, in particular CFK or GFK plastic cloth, whereby the switching flap 7 has a sleeve 24, preferably metallic in the exemplary embodiment shown here, this sleeve being tied into the lightweight construction material of the other switching flap 7. The sleeve 24 is rotationally fixedly connected to the shaft 21, particular by welding or gluing. Since the switching valve 7 is mounted on the same shaft 21 as the armature 19, the swivel axis 11 of the switching valve 7 coincides with the swivel axis 20 of the armature 19.

According to FIG. 2, the high-speed actuating device 8 is designed as a module, which can be inserted into the intake channel 1 according to FIGS. 1A through 1C, for example, whereby the high-speed actuating device 8 comprises a corresponding channel section 24 in which the switching device 6 is situated.

According to the preferred embodiment shown here, the shaft 21 is designed as a hollow shaft in which a torsion rod 26 extends coaxially. On its end 27 which is assigned to the armature 19 and is shown at the left in FIG. 2, this torsion rod 26 is rotationally fixedly connected to the end 42 of the shaft 21 there. For example, radial gear teeth with teeth running axially may be provided in the area of these ends 27, 42. The torsion rod 26 is rigidly clamped on its end 28, which is assigned to the switching device 6 and is shown at the right of FIG. 2. To this end, this right end 28 is rotationally fixedly connected to an immovable component 29 of the high-speed actuating device 8, e.g., again by way of multiple gear teeth. This component 29 may form, for example, a part of a housing of the high-speed actuating device 8.

The shaft 21 is mounted in the area of the switching device 6, because the shaft 21 is rotationally supported by the sleeve 24 on its end 30, which faces way from the armature 19, and by a bushing 31 on the torsion rod 26. This support is provided essentially radially, thus achieving centering of the shaft 21 due to an appropriate contouring of the bushing 31.

The central position of the armature 19 shown in FIGS. 2 and 3 correlates with the central position of the switching device 6 shown in FIG. 1B. In this central position of the armature 19 and/or the switching device 6, the tension on the torsion rod 26 is released, i.e., it does not initiate any restoring torque into the shaft 21.

The switch positions shown in FIGS. 1A and 1C each correspond to a maximum deflection or rotational adjustment of the armature 19 about the angle α in one direction of rotation or the other. The armature 19 then comes to rest with a corresponding stop surface 32 of the respective yoke 17 over a large area. In this switch position the torsion rod 26 is maximally rotated, storing up potential energy and initiating a maximum restoring torque into the shaft 21 which attempts to drive the armature 19 into the other switch position. In order for the armature 19 to remain in the particular switch position, the corresponding retaining forces must be introduced into the armature 19 via the electromagnets 14 and 15.

The gap 18 in the yoke 17 through which the magnetic field lines are deflected in the direction of the armature 19 serves to generate these relatively high retaining forces. The narrower this gap 18, the more pronounced is the bulging of the field lines. The opening width of this gap 18 is expediently dimensioned to be smaller than a thickness 43 of the yoke 17, which is measured next to the stop surface 32, across the axial extent of the yoke 17 and across the stop surface 32. In the present case, the opening width of the gap 18 is even smaller than a thickness 33 of the armature 19, as measured across the radial extent of the armature 19 and across the axial extent of the armature 19. As an additional measure to influence the field lines in the case of a yoke 17, an end section 34 adjacent to the gap 18 is provided with a cross section which decreases down to an end 35 of the yoke 17 situated in the gap 18, causing the field lines to be concentrated in the direction of the stop surface 32. In addition, the gap 18 is positioned so that it is approximately at the center of the armature 19 when the armature 19 is adjacent to the stop surface 32, so that the armature 19 can bridge the field lines between the opposite ends 35 and 36 of the yoke 17 in the gap 18. The measures described here for influencing the magnetic field lines increase the magnetic attractive forces in effect in the armature 19, so that the available power can be converted to torque on the shaft 21 in a particularly advantageous manner.

To be able to implement particularly rapid switching times, the masses to be moved in the present invention are also kept as small as possible, so that in particular minimum moments of inertia are the goal. To this end, the armature 19 is designed to be relatively short with regard to its radial extent from the pivot axis 20. According to FIG. 3, the armature 19 is designed in this radial direction at least to be much smaller than a side 37 of the yoke 17 having the stop surface 32 facing the armature 19. The center of gravity is therefore shifted in the direction of the pivot axis 20. To be able to implement an armature 19 which is short in the radial direction, the yokes 17 are situated very close the shaft 21. The yokes 17 and the shaft 21 are preferably adjacent to one another without coming in contact. In the embodiment shown here, on each yoke 17 one corner 38 is chamfered to thereby position the shaft 21 closer to or virtually inside the interspace between the yokes 17.

As an additional measure to reduce the masses to be moved, the cross section of the armature 19 through which the magnetic field lines flow, i.e., the cross section of the armature 19 which extends over the thickness 33 in the axial direction, is designed to be much smaller than the cross section of the yoke 17 through which the magnetic field lines flow outside of the stop surface 32 and/or outside of the tapered end section 34. In the embodiment shown here, the cross section of the armature 19 through which the magnetic field lines flow is approximately half as large as the cross section of the yokes 17 through which the magnetic field lines flow.

To be able to transmit sufficiently large forces to the armature 19, it is considerably longer in the axial direction of the shaft 21 than in the radial direction (see FIG. 2). Preferably the extent of the armature 19 in the axial direction is at least two or three times greater than that in the radial direction. In the exemplary embodiment shown here, the axial extent of the armature 19 is more than four times greater than its radial extent. It is clear that the electromagnets 14 and 15 and/or their coils 16 and yokes 17 accordingly have a corresponding axial extent to be able to introduce the desired forces into the armature over the entire axial length of the armature 19.

Figure 4:
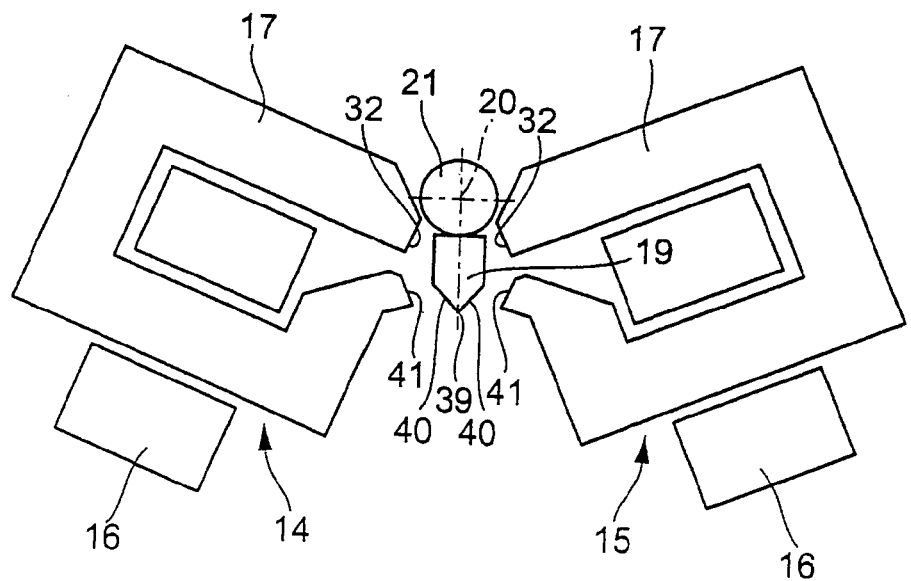
FIG. 4 a highly simplified cross section like that in FIG. 3 but in another embodiment.

According to FIG. 4, as an additional measure for reducing the moving masses, an end 39 of the armature 19 at a distance from the swivel axis 20 may have beveled flanks 40, in which case then the stop surfaces 32 will have a complementary stop flank 41. In addition, the orientation of the field lines in the direction of the armature 19 can also be influenced by these stop flanks 41, thus yielding an additional reinforcement of the attractive or repulsive effect.

The high-speed actuating device 8 according to this invention operates as follows:

Starting from the middle position of the armature shown in FIGS. 2 through 4 and thus also the middle position of the switching device 6, the armature 19 is first actuated into one of its two switch positions. This is expediently the open position shown in FIG. 1C. Since the torsion rod 26 is designed for generating extremely high restoring torques, the desired switch position can be approached directly from the middle position only with a very high electric power. Therefore, it is advantageous to have the sequence of a starting procedure prior to operation; in this starting procedure, through a specific sequence of polarity reversal processes, oscillation is induced in the oscillating system formed by the rotating rod 26, the shaft 21, the armature 19 and the switching device 6, with their amplitudes increasing progressively. This "build up" of the oscillating system is continued until the armature 19 comes to rest in the desired switch position on the corresponding yoke 17.

For switching between one switch position and the other switch position, the electromagnets 14 and 15 are turned on in alternation. The armature 19 is accelerated toward the other switch position due to the attractive forces which are then built up and act in opposition. At the same time, the torsion rod 26 can relax, so that the acceleration of the armature 19 is extremely increased precisely in the initial phase of the actuating movement. The pivoting adjustment of the armature 19 over the common shaft 21 at the same time produces a corresponding pivoting adjustment of the switching device 6. The use of the torsion rod 26 here as a driving means and as an energy storage device is particularly advantageous because the torsion rod 26 itself has only a low moment of inertia and therefore its driving energy can be transmitted to the shaft 21 with virtually no retardation.

Figure 5:
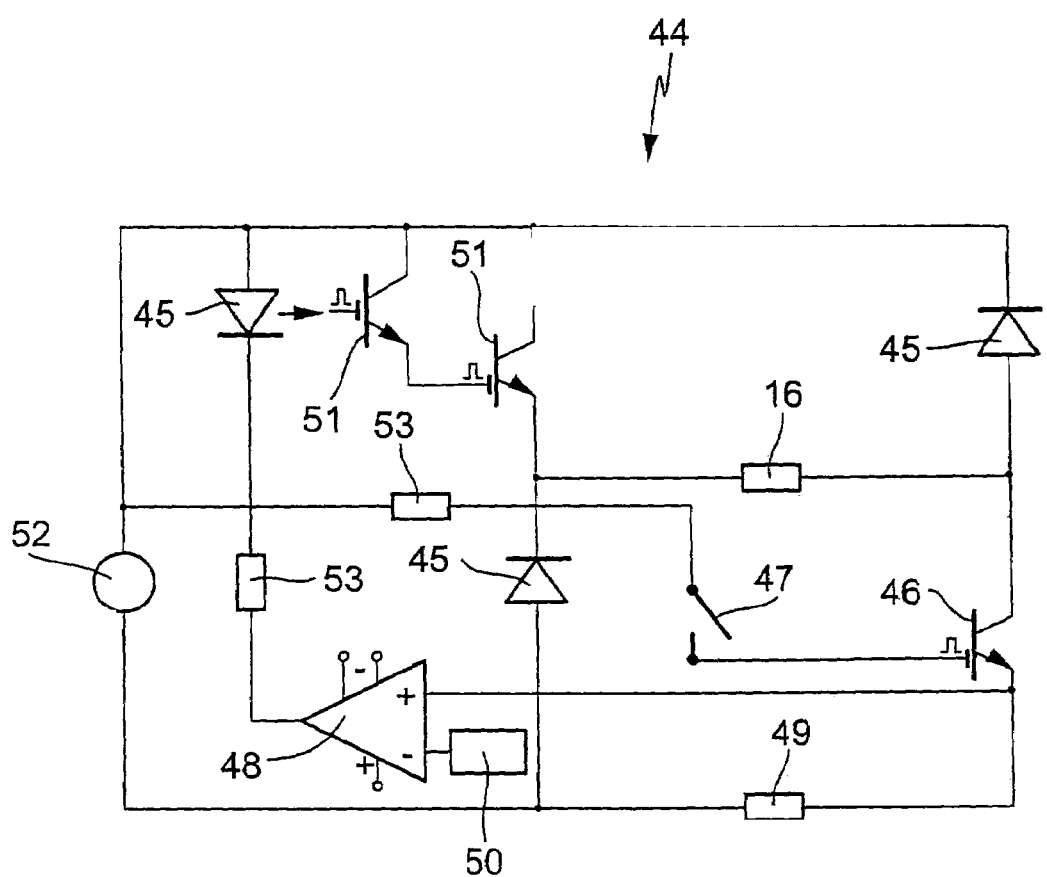
FIG. 5 a circuit configuration for connecting an electromagnet of the high-speed actuating device.

For operation, i.e., triggering, of the electromagnets 14 and 15, a circuit configuration 44 according to FIG. 5 is preferred. Such a circuit configuration 44 uses chopping of the current flow through the coil 16 of the respective electromagnet 14, 15. With regard to high-speed electromagnets 14, 15, this type of triggering offers considerable advantages in comparison with other principles. With the help of this triggering, the three following states of the electromagnets 14, 15 must be implemented in particular under all operating conditions: energy supply, energy maintenance and energy dissipation. As a rule a so-called H-bridge is used for this purpose and is also implemented in the circuit configuration 44 in FIG. 5, whereby instead of the diodes 45, corresponding transistors may also be used. An on/off transistor 46 is used for turning the coil 16 of the respective electromagnet 14 or 15 on and off. This on/off transistor 46 is operated by a switch 47. A chopper current regulator 48 compares an actual current which can be determined with the help of a measurement element 49 with a setpoint current which is predetermined at 50, e.g., by an engine control unit. The chopper current regulator 48 operates a chopper transistor, i.e., a chopper transistor configuration 51, as a function of this comparison, to thereby regulate the current flow from a power supply 52 to the coil 16 of the respective electromagnet 14 or 15 at the setpoint level. In addition, two series resistors 53 are provided in the circuit configuration 44.

The measurement element 49 has a definite point of reference due to the arrangement of the measurement element 49 which is selected in the preferred embodiment of the circuit configuration 44 shown here and which is preferably designed as a current sensor or as a measuring shunt on the emitter of the on/off transistor 46. This makes is possible for the current flow to be reliably detected with the help of the measurement element 49 during the entire period of energization of the coil 16. In addition, the circuit configuration 44 presented here has the advantage that the chopper transistor 51 can be designed as a so-called high transistor and consequently also the predetermination of the setpoint current has a definite reference point to the actual current. The H-bridge shown in the circuit configuration 44 is characterized in that the measurement element 49 is situated between the on/off transistor 46 and the reference point for the current measurement, with the chopper transistor 51 as the high transistor also being applied to the other pole of the operating voltage. This design has a positive effect on the measurement dynamics and consequently also on the switching frequency of the electromagnets 14, 15 that can be achieved with the help of the circuit configuration 44 shown here. In addition, the circuit configuration shown here can also maintain the fluctuations in the chopped current flow with sufficient accuracy while the inductance is variable.

Chopping the current flow may be accomplished, for example, as a function of a predetermined chopper frequency. Likewise, it is possible to perform the chopping with the help of predetermined current limits which are selected to be relatively narrow between which the current flow fluctuates during the chopping.

What is claimed is:

1. A high-speed actuating device suitable for actuating a switching flap between two switch positions with very short switching times, whereby the switching flap is situated in a gas-carrying line and closes off the line cross section in the first switch position and opens the line cross section in the second switch position, wherein
   a) the high-speed actuating device has two switchable electromagnets between which is arranged an armature which is drive-coupled to the switching flap, whereby the armature is in contact with the one electromagnet in the first switch position of the switching flap and is in contact with the other electromagnet in the second switch position of the switching flap device,
   b) the armature is fixedly connected to a shaft which is mounted to rotate about its longitudinal axis, and the switching flap is also fixedly mounted but is axially offset in relation to the armature, and
   c) each electromagnet has a yoke on which is provided a stop surface for the armature against which the armature comes to rest in one of the switch positions, whereby the yoke is interrupted in the area of the stop surface by a gap which is bridged by the armature when the armature is in contact with the stop surface, and
   d) the yoke has a cross section which tapers to the gap on an end section which terminates at the gap.

2. The high-speed actuating device according to claim 1, wherein the opening width of the gap is smaller than the thickness of the yoke as measured next to the stop surface and across the axial extent of the yoke and across the stop surface or is smaller than the thickness of the armature measured across the radial extent and across the axial extent of the armature.

3. The high-speed actuating device according to claim 1, wherein the electromagnets are positioned in relation to the shaft so that the yokes are arranged close to the shaft.

4. The high-speed actuating device according to claim 1, wherein with respect to the shaft, the armature is larger in the axial direction, in particular at least two, three or four times larger than in the radial direction.

5. The high-speed actuating device according to claim 1, wherein a spring element is coupled to the shaft, with the coupling being accomplished in such a way that in both switch positions of the switching flap, the spring element initiates a restoring torque into the shaft driving the switching flap in the direction of the other switch position, and in a central position of the switching flap, the spring element does not initiate any restoring torque into the shaft.

6. The high-speed actuating device according to claim 5, wherein the shaft is designed as a hollow shaft, and the spring element is designed as a torsion rod which extends coaxially in the hollow shaft, is connected at one end in a rotationally fixed manner to the hollow shaft and at the other end in a rotationally fixed manner to a stationary component of the high-speed actuating device.

7. The high-speed actuating device according to claim 6, wherein the torsion rod is attached to the end of the hollow shaft assigned to the armature, and on its end assigned to the switching flap, the hollow shaft is supported radially in a rotationally adjustable manner on the torsion rod either directly or indirectly.

8. The high-speed actuating device according to claim 1, wherein the switching flap which is arranged in the line cross section in such a way that the shaft stands essentially perpendicular to a longitudinal axis of the line.

9. The high-speed actuating device according to claim 1, wherein the switch flap extends essentially parallel to the longitudinal axis of the line in its second switch position, which opens the line cross section, and in its first switch position which closes the line cross section, the switch flap tends at an inclination to the line cross section.

10. The high-speed actuating device according to claim 9, wherein the switch flap extends at an angle of approximately 45° to the line cross section in its first switch position which seals off the line cross section.

11. The high-speed actuating device according to claim 8, wherein the gas-carrying line is formed by a fresh air supply line of an internal combustion engine, in particular of a motor vehicle, which supplies fresh air to at least one combustion chamber of the internal combustion engine, whereby the switching flap is situated upstream from at least one intake valve of the particular combustion chamber in the fresh air supply line.

12. A method of using a high-speed actuating device suitable for switching a switching flap in an internal combustion engine, comprising the steps of:
   a) providing a high-speed actuating device having first and second switchable electromagnets, the first electromagnet having a first yoke provided with a first stop surface and the second electromagnet having a second yoke provided with a second stop surface;
   b) arranging between the switchable electromagnets an armature drive-coupled to a switching flap having first and second switch positions situated upstream from at least one intake valve in an intake channel leading to at least one combustion chamber of the internal combustion engine, the armature being in contact with the first electromagnet in the first switch position of the switching flap against the first stop surface and being in contact with the second electromagnet in the second switch position of the switching flap device against the second stop surface, the first yoke being interrupted near the first stop surface by a first gap bridged by the armature when the armature is in contact with the first stop surface and the second yoke being interrupted near the second stop surface by a second gap bridged by the armature when the armature is in contact with the second stop surface, each yoke having a cross section tapering to the respective gap on a respective end section terminating at the gap;

c) connecting the armature to a shaft mounted to rotate about a longitudinal axis of the shaft, and mounting the switching flap so as to be axially offset in relation to the armature; and
d) using the high-speed actuating device to switch the switching flap.

13. The method according to claim 12 wherein the internal combustion engine is disposed in a motor vehicle.

14. A high-speed actuating device suitable for actuating a switching flap between two switch positions with very short switching times, whereby the switching flap is situated in a gas-carrying line and closes off the line cross section in the first switch position and opens the line cross section in the second switch position, wherein
   a) the high-speed actuating device has two switchable electromagnets between which in arranged an armature which is drive-coupled to the switching flap, whereby the armature is in contact with the one electromagnet in the first switch position of the switching flap and is in contact with the other electromagnet in the second switch position of the switching flap device,
   b) the armature is fixedly connected to a shaft which is mounted to rotate about its longitudinal axis, and the switching flap is also fixedly mounted but is axially offset in relation to the armature,
   c) each electromagnet has a yoke on which is provided a stop surface for the armature against which the armature comes to rest in one of the switch positions, whereby the yoke is interrupted in the area of the stop surface by a gap which is bridged by the armature when the armature is in contact with the stop surface, and
   d) with respect to the shaft, the radial extent of the armature is shorter than one side of the yoke on which the stop surface is designed.

15. The high-speed actuating device according to claim 14 wherein the radial extent of the armature is half as large as one side of the yoke on which the stop surface is designed.

16. A high-speed actuating device suitable for actuating a switching flap between two switch positions with very short switching times, whereby the switching flap is situated in a gas-carrying line and closes off the line cross section in the first switch position and opens the line cross section in the second switch position, wherein
   a) the high-speed actuating device has two switchable electromagnets between which is arranged an armature which is drive-coupled to the switching flap, whereby the armature is in contact with the one electromagnet in the first switch position of the switching flap and is in contact with the other electromagnet in the second switch position of the switching flap device,
   b) the armature is fixedly connected to a shaft which is mounted to rotate about its longitudinal axis, and the switching flap is also fixedly mounted but is axially offset in relation to the armature,
   c) each electromagnet has a yoke on which is provided a stop surface for the armature against which the armature comes to rest in one of the switch positions, whereby the yoke is interrupted in the area of the stop surface by a gap which is bridged by the armature when the armature is in contact with the stop surface, and
   d) the cross section of the armature in the direction of flux of the magnetic field is smaller than the cross section of the yoke outside of the stop surface.

17. The high-speed actuating device according to claim 16 wherein the cross section of the armature in the direction of flux of the magnetic field is halt as large as the cross section of the yoke outside of the stop surface.

18. A high-speed actuating device suitable for actuating a switching flap between two switch positions with very short switching times, whereby the switching flap is situated in a gas-carrying line and closes off the line cross section in the first switch position and opens the line cross section in the second switch position, wherein
   a) the high-speed actuating device has two switchable electromagnets between which is arranged an armature which is drive-coupled to the switching flap, whereby the armature is in contact with the one electromagnet in the first switch position of the switching flap and is in contact with the other electromagnet in the second switch position of the switching flap device,
   b) the armature is fixedly connected to a shaft which is mounted to rotate about its longitudinal axis, and the switching flap is also fixedly mounted but is axially offset in relation to the armature, and
   c) a switching arrangement which is provided for switching the electromagnets is designed as an H-bridge, has an on/off transistor and a chopper transistor which is controlled by a chopper current regulator as a function of a comparison between a predetermined or predeterminable setpoint current and an actual current, which can be determined with the help of a measurement element, whereby the measurement element is connected to the emitter of the on/off transistor on the one hand and to ground on the other hand.

* * * * *

UNITED STATES PATENT AND TRADEMARK OFFICE
CERTIFICATE OF CORRECTION

PATENT NO. : 7,007,921 B2
DATED : March 7, 2006
INVENTOR(S) : Elsässer et al.

It is certified that error appears in the above-identified patent and that said Letters Patent is hereby corrected as shown below:

Column 11,
Line 16, after "which", change "in" to -- is --.

Column 12,
Line 18, after "is", change "halt" to -- half --.

Signed and Sealed this

Ninth Day of May, 2006

JON W. DUDAS
*Director of the United States Patent and Trademark Office*